United States Patent [19]

Somerville et al.

[11] Patent Number: 5,049,285

[45] Date of Patent: Sep. 17, 1991

[54] SOLIDIFICATION PROCESS WITH ENHANCEMENT OF HEAVY METALS INSOLUBILIZATION

[75] Inventors: Robin B. Somerville, Galveston, Tex.; Liang-tseng Fan, Manhattan, Kans.

[73] Assignee: Solidiwaste Technology, L.P., Manhattan, Kans.

[21] Appl. No.: 407,102

[22] Filed: Sep. 14, 1989

Related U.S. Application Data

[63] Continuation-in-part of Ser. No. 177,613, Apr. 5, 1988, abandoned, which is a continuation of Ser. No. 883,360, Jul. 8, 1986, abandoned.

[51] Int. Cl.$^5$ ............ C02F 1/62

[52] U.S. Cl. ............ 210/710; 210/751; 210/912; 106/697

[58] Field of Search ............ 210/710, 724, 726, 743, 210/751, 912–914; 405/128, 129; 106/697

[56] References Cited

U.S. PATENT DOCUMENTS

| | | | |
|---|---|---|---|
| 3,740,331 | 6/1973 | Anderson et al. | 210/912 |
| 4,018,679 | 4/1977 | Bölsing | 210/751 |
| 4,116,705 | 9/1978 | Chappell | 210/751 |
| 4,124,405 | 11/1978 | Quienot | 210/751 |
| 4,142,912 | 3/1979 | Young | 210/751 |
| 4,329,224 | 5/1982 | Kim | 210/912 |
| 4,364,773 | 12/1982 | Veronneau et al. | 210/726 |
| 4,518,508 | 5/1985 | Conner | 210/751 |
| 4,687,373 | 8/1987 | Falk et al. | 210/751 |
| 4,952,242 | 8/1990 | Earp | 210/751 |

FOREIGN PATENT DOCUMENTS

| | | | |
|---|---|---|---|
| 81403 | 6/1983 | European Pat. Off. . | |
| 124966 | 11/1984 | European Pat. Off. . | |
| 2614848 | 10/1977 | Fed. Rep. of Germany | 210/751 |
| 2717656 | 10/1978 | Fed. Rep. of Germany . | |
| 1458501 | 11/1966 | France . | |

*Primary Examiner*—Tom Wyse

*Attorney, Agent, or Firm*—Harrison & Egbert

[57] ABSTRACT

The process for immobilizing a hazardous waste containing heavy metals comprises the steps of pretreating the waste by adding a sulfide to the hazardous waste so as to generate the sulfides of the heavy metals from the hazardous waste, mixing a chemical reagent with the pretreated waste, and blending the mixture of the chemical reagent and the pretreated waste with a pozzolanic material. The chemical reagent contains a mixture of a retarder and an accelerator. This process further comprises the step of mixing a neutralizing reagent with the hazardous waste so as to cause the hazardous waste to have a pH of between 5 and 14. The neutralizing reagent is an alkaline material, preferably lime, hydrated lime, or calcium hydroxide. The sulfide is either sodium hydrosulfide or sodium sulfide. The process further includes the step of separating the pretreated waste containing the generated sulfides of the heavy metals from the supernatant portion of the liquid hazardous waste prior to the step of mixing the chemical reagent. The retarder of the chemical reagent is a monomeric polyalcohol. The accelerator is calcium chloride.

16 Claims, 2 Drawing Sheets

SOLIDIFICATION PROCESS WITH ENHANCEMENT OF HEAVY METALS INSOLUBILIZATION

RELATED APPLICATIONS

The present application is a continuation-in-part of U.S. patent application Ser. No. 177,613, filed on Apr. 5, 1988 and entitled "Chemical Reagent and Process for the Disposal of Waste", now abandoned. U.S. patent application Ser. No. 177,613 was a continuation of U.S. patent application Ser. No. 883,360, filed on July 8, 1986, now abandoned.

TECHNICAL FIELD

The present invention relates to the field of disposal of inorganic and organic waste including chemical waste and low-level and medium-level nuclear waste and, more particularly, to the field of disposal of waste via microencapsulation or solidification. Still more particularly, the present invention relates to the field of disposal of waste in which the heavy metals within the waste are insolubilized so as to allow such heavy metals to be reacted with a chemical reagent in pozzolanic material to form a solid suitable for safe storage of disposal.

BACKGROUND OF THE INVENTION

One of the biggest problems facing the industrial world is the disposal of waste that has been generated and is presently being generated by the various industries. Several techniques were developed in the past to solve the problem. One method involved the use of landfills where the waste is transported for disposal. The disadvantage of that method is that it requires the transportation of the waste to the landfill from areas that are very distant from such landfills, thereby making such disposal uneconomical and often times hazardous to the populated areas through which the waste is transported. Another disadvantage is that, in the landfill, the waste is merely covered and permanently contained whereby the problem is passed on to future generations. Waste being disposed in landfills may seep through the ground to subterranean water streams and the waste could be returned to populated areas through the natural waste streams. The Environmental Protection Agency has issued regulations prohibiting the prior practice of disposing of liquid waste in landfills and regulating the types of solid waste and solidified waste which can be disposed in certain landfills. Such regulations have made many prior art practices obsolete.

Another method used in the past for the disposal of waste has been chemical treatment. One disadvantage of such treatment is that it is not effective because most of the compounds presently in waste, and especially hazardous waste, do not react chemically with other compounds to form non-hazardous compounds. Furthermore, even if the conversion to harmless compounds is possible, such a process is uneconomical.

Incineration has also been and is used as a means for the disposal of waste. Incineration, however, is not effective in numerous applications; in fact, it is totally ineffective for wastes containing heavy metals and their compounds. Furthermore, incineration processes result in the formation of other undesirable chemicals in the form of ash or gases emitted to the environment. Furthermore, incineration is a very costly process that requires highly sophisticated incineration equipment and requires the transportation of the waste to special locations for the incineration to be performed.

Another method that has been used in the past for the disposal of waste has been the process of solidifying the waste by mixing it with sawdust, various pozzolanic materials and polymeric substances. One disadvantage of such methods is their inability to adequately solidify liquid or sludge-type waste. Another disadvantage is that several pozzolanic materials used in the past have not been shown to be effective because of their physical or chemical properties. Attempts in the past, for example, to solidify waste with Portland cement produced a solid product which was very permeable, porous, subject to leaching and deficient in mechanical strength. The use of the other pozzolanic materials having better physical properties for promoting the interaction of various compounds, such as fly ash, was also ineffective because such materials possessed undesirable properties such as quick setting before the waste could be uniformly dispersed in such material. Although used as a bonding agent, polymers have not been shown to have successfully bonded most wastes and, to be successful, large quantities of the polymer are required. Furthermore, the use of polymeric compounds to promote the solidification is also undesirable because many polymeric compounds themselves are complex and hazardous, the resulting waste compound is toxic, and chemical attack, such as sulfate attack, is prompted by such polymers. Also, the resultant waste compound degenerates over time when polymers are used. Thus, such disposal is often not permanent.

Numerous wastes, in various forms, liquid, solid and slurry, can be made non-hazardous by immobilizing them through solidification processes. Nevertheless, many wastes contain heavy metals, such as arsenic, cadmium, chromium, copper, nickel, mercury, lead, and zinc, or their compounds. While their solubilities are often relatively small, their toxicity limits are extremely small. Thus, it is highly desirable or sometimes even essential that the solubilities of heavy metals and their compounds be substantially reduced in the course of waste solidification.

It is an object of the present invention to provide a solidification process that immobilizes the hazardous waste.

It is another object of the present invention to provide a process that reduces the solubility of heavy metals and their compounds.

It is another object of the present invention to provide a waste disposal process that reduces the solubilities of heavy metals in an inexpensive, safe, and simple manner.

It is still a further object of the present invention to provide a process for the disposal of waste that makes such waste easily transportable and easily disposable in landfills or in readily available natural disposal sites, such as salt domes and the like.

These and other objects and advantages of the present invention will become apparent from a reading of the attached specification and appended claims.

SUMMARY OF THE INVENTION

The present invention is a process for immobilizing a hazardous waste containing heavy metals. The process comprises the steps of: (1) pretreating the hazardous waste by adding a sulfide to the waste so as to generate in situ the sulfides of the heavy metals on the surface and inside of the waste's solid particles or to generate the precipitate of the sulfides of the heavy metals from the liquid portion of the waste: (2) mixing a chemical reagent with the waste containing the generated sulfides of the heavy metals; and (3) blending the resultant mixture with a pozzolanic material. This process further includes the step of mixing a neutralizing agent with the hazardous waste so as to cause the hazardous waste to have a pH of between 5 and 14 and, preferably, between 7 and 11. The neutralizing agent is an alkaline material, preferably lime, hydrated lime, or calcium hydroxide. The sulfide is either sodium hydrosulfide or sodium sulfide. This process further includes the step of separating the waste containing the generated sulfides of the heavy metals from the supernatant portion of the hazardous waste prior to the step of mixing the hazardous waste with the chemical reagent.

The chemical reagent includes a retarder, which could be glycerine or other viscosity-altering reagent, and an accelerator, namely calcium chloride. The retarder prevents the flash setting of the pozzolanic material and slows the setting process, whereas the accelerator promotes the solidification activity. The retarder further acts as a lubricant and improves the viscosity. The pozzolanic material may be not only pozzolanic material specifically manufactured for cementing operations, such as Portland cement, but also waste material produced in several industrial applications, such as fly ash, kiln dust, and steel or lead baghouse dust. The solid waste materials, containing the heavy metals, which are thusly formed may thereafter be stored or disposed in natural storage places without affecting or harming the environment.

DETAILED DESCRIPTION OF THE INVENTION

Figure 1:
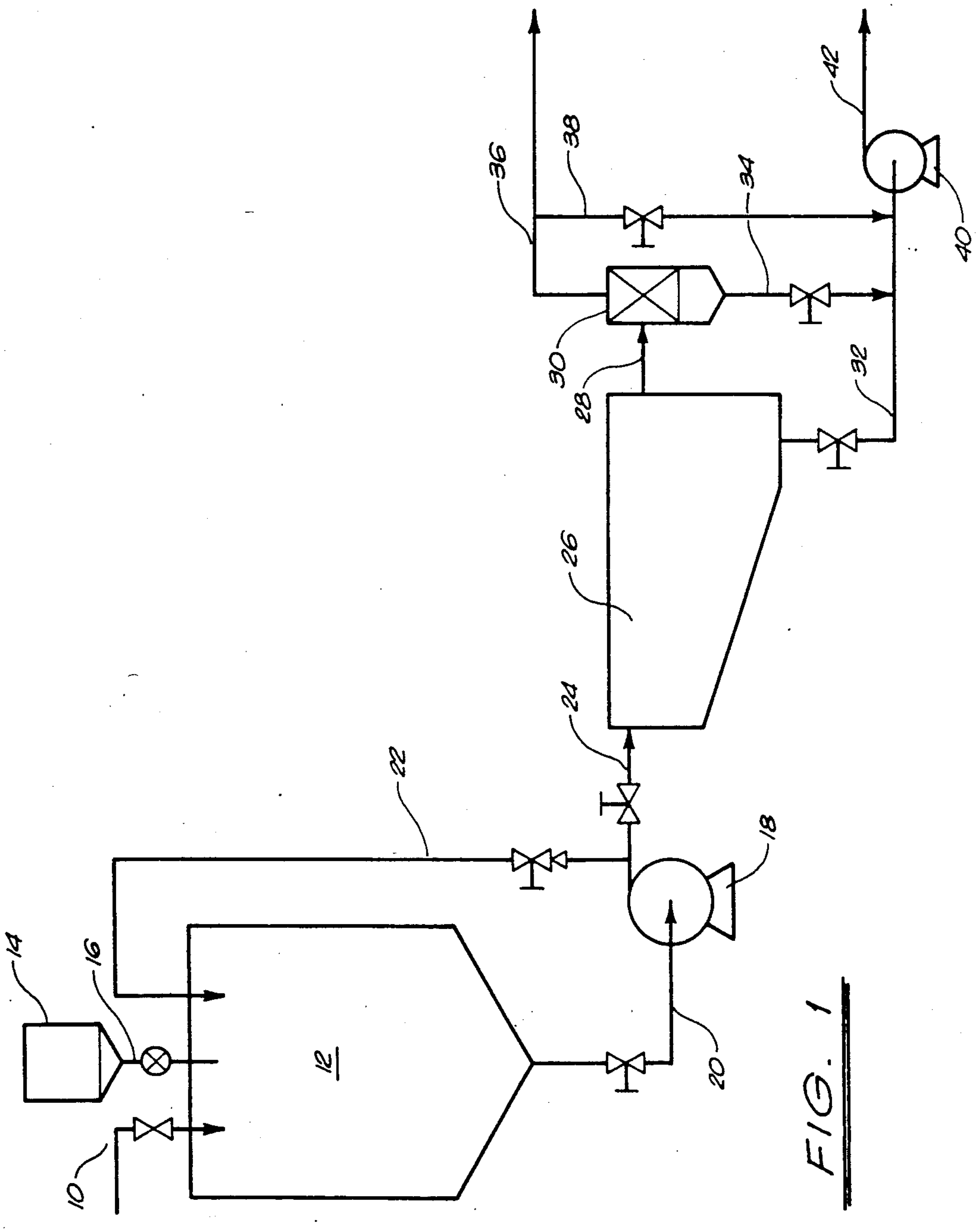
FIG. 1 is a flow diagram of the process of the present invention in a semibatch mode of operation.

According to the present invention, the present invention is a process for immobilizing in situ hazardous waste containing heavy metals. In particular, the wastes contain such heavy metals as arsenic, cadmium, chromium, copper, nickel, mercury, lead, zinc, or compounds of such heavy metals. The process of the present invention comprises pretreating the hazardous waste by adding a sulfide to the waste so as to generate in situ the sulfides of the heavy metals contained in the solid particles of the waste or to generate the precipitate of sulfides of the heavy metals from the portion of the waste. After the sulfides of the heavy metals are generated from the hazardous waste, a suitable chemical reagent having a retarder and an accelerator is mixed with the hazardous waste containing the generated sulfides of the heavy metals. Finally, this mixture of the chemical reagent and the waste containing the generated sulfides of the heavy metals is blended together with a pozzolanic material.

Initially, it is important to the present invention that a neutralizing agent be mixed with the hazardous waste where the hazardous waste is an acidic liquid or slurry waste. If the waste is an acidic solid waste, the waste must be transformed into a slurry with water. The purpose of the neutralizing agent is to render the acidic liquid or slurry waste slightly acidic, neutral, or alkaline. The neutralizing agent should be added in such a quantity so as to cause the hazardous waste to have a pH of between 7 and 14. Preferably, this neutralizing agent should be added so as to cause the hazardous waste to have a pH of between 8.5 and 11. In the preferred embodiment of the process of the present invention, the neutralizing or pH-adjusting reagent is lime (calcium oxide) or calcium hydroxide ($Ca(OH)_2$). These neutralizing or pH-adjusting reagents are known to appreciably insolubilize heavy metals or their compounds.

After the heavy metal-containing hazardous waste has been neutralized, the sulfide is added to the hazardous waste for the purpose of generating the sulfides of the heavy metals. This "sulfide" is a sulfur compound or a mixture of sulfides. This is added to the waste, treated by the neutralizing agent, in the form of a solid, slurry, solution or gas. In the present invention, the preferred sulfides are sodium hydrosulfide (NaHS) and sodium sulfide ($Na_2S$). The reason why sodium hydrosulfide and sodium sulfide are preferred is because of the relatively low prices, their moderate to high solubilities, their lack of toxicity, and their ease of storage and handling. The solubility products of sulfides of the heavy metals range from $4.5\times10^{-24}$ for zinc sulfide (ZnS) to $4.0\times10^{-53}$ for mercuric sulfide (HgS). The heavy metals in the liquid portion of the waste are precipitated as sulfides and those on or near the surface of the solid particles of the waste and some inside them are also transformed into sulfides. By this step of the present invention, the desirable result of reducing the solubility of the heavy metals contained within the waste is achieved; the benefit of entrapment, encapsulation, immobilization, and dispersion by the particles of the original waste is retained. Once the heavy metals are transformed into sulfides from the waste, the pretreated waste is solidified in its entirety. It may also be solidified after part of the liquid (the supernatant) is removed with one or more devices for liquid/solid separation. This minimizes the volume of the solidified waste and reduces the cost of solidification. Settling tanks, inclined screens, vibrating screens, water cyclones, centrifuges, and filters are some of these devices used to remove the supernatant.

When the heavy metals contained in the waste have been transformed into sulfides, the pretreated waste is then mixed with a chemical reagent. In the present invention, the chemical reagent has unique properties for the solidification of such waste. This chemical reagent is mixed with the pretreated waste containing the sulfides of the heavy metals and with pozzolanic material to form a solid waste material.

The chemical reagent is primarily composed of a retarder and an aqueous solution of an accelerator compound. In the present invention, the retarder is glycerine, a well-known compound readily available in the market, or another viscosity-altering reagent. The retarder may also be glycerine in combination with other viscosity-altering reagents. Other retarders can be used alone, or in combination, depending upon their availability, economics, and the properties of the waste. Although the glycerine is a suitable retarder and could be used alone or with other retarders in different compositions in the various applications in accordance with the present invention, it is preferred that glycerine be used in most applications because of its superior retarding and lubricating properties. The retarder prevents "flash" setting and slows the setting and solidification of the pozzolanic material when mixed with the water and the heavy metal-containing waste. It is believed that the retarder coats the particles of the pozzolanic material and waste so as to slow solidification. The retardation of the solidification permits sufficient time to uniformly mix the pozzolanic material and the waste to achieve a uniform encapsulation and bonding of the waste in the resultant waste product. Further, this slower setting time produces a greater mechanical strength in the resultant waste product. The retarder further acts as a lubricant. As a lubricant, the retarder provides an appropriate viscosity and provides friction-reducing properties to facilitate the mixing of the chemical reagent, the wastes and the pozzolanic material in the manner hereinafter described. The preferred accelerator compound is calcium chloride ($CaCl_2$) which promotes the setting process of the pozzolanic material. The chemical reagent may also include other solvents that remain neutral during the solidification process in question.

The chemical reagent is prepared by mixing an aqueous solution of calcium chloride with the retarder by well-known mixing techniques. The amount of calcium chloride present in the aqueous solution that serves as the start-up material for the chemical reagent may range from 15% by weight to saturation. The amount of retarder used in the chemical reagent depends on the retarding and viscosity properties desired, and on the properties of the waste being treated. If, for example, a longer setting time is desired, the amount of retarder is increased. In a typical application, the amount of retarder may range from 0.01 to 15 parts of retarder per 100 parts of reagent chemical in undiluted form. It should be understood that a person skilled in the art could vary the amount of retarder to conform with certain application requirements. The chemical reagent is a non-toxic, homogeneous solution that retains its homogeneity and stability for a long time. The reagent could be easily stored at temperatures ranging from −40° F. to 95° F. and above. Because the retarder and accelerator compounds are inexpensive and because the mixing process is simple, the cost of the reagent is also inexpensive.

Many different pozzolanic materials may be used. The materials include fly ash produced in coal-fired power stations, either Class C fly ash known for its high calcium content or Class F fly ash characterized by it high silica and aluminum oxide content; cement kiln dust, lime kiln dust characterized by high calcium content; steel or lead baghouse dust; silica fume dust from the refractory industry; gypsum; and Portland cement. The majority of pozzolanic materials listed herein could be characterized as waste material. The use of such waste pozzolanic material is a unique feature of the present invention in that pozzolanic wastes serve to dispose of other wastes, including chemical and low-level and medium-level radioactive waste described hereinafter. The choice of pozzolanic material to practice the present invention would depend on the availability of such material in the particular location, the price of such material, the needs of the entity generating the waste, and the guidelines of the regulatory authorities. In certain areas of the United States of America, for example, where fly ash is available in large quantities, fly ash could be used. In special circumstances, the nature of the waste to be treated may require the use of pozzolanic materials with higher calcium content such as Portland cement or lime kiln dust to perform the cementation process.

In the present invention, the utilization of the chemical reagent described herein enables one to employ a pozzolanic material having a large reactive surface, whereby the pozzolanic material reacts more readily with the waste and forms a resultant waste product which has a large density and small cores. It is preferable that the pozzolanic material used has small, uniform particulate components with a high content of calcium and other cementation elements. Either Class C or Class F fly ash, for example, is a pozzolanic material that is composed of very small, spherical, uniform particles. Accordingly, both types of fly ash possess a superior ability to absorb, react with, or entrap the constituents of hazardous wastes. Class C fly ash, however, tends to set very quickly when mixed with water and waste. Therefore, its use without the chemical reagent of the present invention would not be practical. On the other hand, Class F fly ash contains a relatively small amount of calcium, a material that contributes to the mechanical strength and bonding forces of the resultant waste product. Therefore, Class F fly ash alone would not produce a solid waste-containing compound with great mechanical strength. The use of the present chemical reagent compensates for such deficiencies by providing the retarder to prevent the flash setting of the Class C fly ash when it is mixed with water and waste and by providing calcium to enhance the mechanical strength of the resultant waste solid.

An important aspect of the process disclosed by the present invention is the requirement that the mixing, blending, and related steps be carried out simultaneously or in specific sequence in order to obtain optimum results. The sequence of the steps depends on whether the organic or inorganic waste to be treated is a liquid, a slurry, or a solid heavy metal-containing waste. It should be understood that the term "solid waste" as used in the specification should mean waste that contains less than about 15 wt % of liquid in free form. "Slurry waste" used in the specification should mean waste that contains 15 wt % to 60 wt % of liquid in free form. "Liquid waste" as used herein means waste that contains more than about 60 wt % of liquid in free form. If the waste is a liquid or slurry waste, as defined herein, it is essential that the liquid or slurry heavy metal-containing waste be mixed first with the chemical reagent in a conventional mixer suitable for such mixing for a sufficient time to obtain a uniform distribution of the chemical reagent in the liquid or slurry heavy metal-containing waste. The resultant mixture, comprising the liquid or slurry heavy-metal containing waste and the uniformly distributed chemical reagent, is then blended or mixed with the pozzolanic material for a sufficient time to obtain complete and uniform mixing. Following such mixing, the mixture is allowed to solidify to form waste solids. It may be desirable to pour the mixture into casting containers or molds to form the waste solids in predetermined shapes, such as blocks, for ultimate disposal.

It is preferred that the process for a liquid heavy metal-containing waste be performed in a continuous mixer. The continuous mode may be carried out by utilizing well-known mixing and blending equipment. For example, the mixing of the liquid waste with the chemical reagent may be carried out in a blending pump or in an in-line blender and the mixing of the resultant mixture and the fly ash may be carried out in a screw-type or a ribbon-type blender. Although it is preferred that the process for a liquid heavy metal-containing waste be carried out in a continuous mode, a batch or semibatch mode also may be utilized, particularly when only a relatively small amount of waste requires solidification.

The process of the present invention may be utilized to treat a wide variety of organic and inorganic heavy metal-containing waste, including chemical and low and medium-level nuclear waste, which are produced by industrial processes and other applications including, but not limited to, aromatic heavy oils and tars, creosote sludges, sludges and tars, tank bottoms; petroleum heavy oils, tars and sludges; petrochemical heavy oils and tars and all by-products and tank residues including polymers; halogenated organic sludges containing PCB's, dioxins and other chlorinated solvents; manufacturing tank bottoms; pesticide/herbicide sludges including arsenic; organic and inorganic sludges and wastes including leaded tank bottom cleaning; inorganic sludges, electroplating and metal finishing sludges and wastes, chrome, zinc, etc.; contaminated soils, PCB and dioxin contaminated soil, tainted dirt and soil; waste gases adsorbed or entrapped in solids or absorbed in liquids, and incinerator ash.

With regard to the amount of chemical reagent and pozzolanic material utilized to treat various wastes, the amount depends on the kind of waste being treated and the particular requirements of the process. In typical applications, the amount of chemical reagent ranges from ¼ ounce to 2 ounces of chemical reagent per pound of waste material being treated and the amount of pozzolanic material ranges from 1.5 ounces to 2 pounds of pozzolanic materials per pound of waste material. In the treatment of liquid waste containing solids, the amount of pozzolanic material required decreases as the amount of suspended solids in the liquid waste increases. It is preferred that, before waste is treated, laboratory tests be carried out with the particular waste to determine the optimum amounts of pozzolanic material and chemical reagent required.

In the process of the present invention, the chemical reagent, the pozzolanic material and the waste are cross-linked and bonded in the solidification process which changes the physical and chemical properties of the heavy metal-containing waste. The process reduces the coefficient of permeability, and the matrix plasticity index of the waste, while it increases the mechanical internal strength into a load-bearing mass upon solidification. The process provides a microencapsulation that surrounds and seals the portion of the matrix that is not chemically incorporated into the reaction, whereby the ingredients become microencapsulated in the interstices formed by the particles of pozzolanic material and virtually impermeable and essentially free of leaching. Reactions between the various components are thoroughly distributed throughout the particulate surfaces in every part of the mass of the heavy metal-containing waste. Some waste material takes an active role in the process and functions as a chemical reagent on its own and further contributes to the physical hardening and reduction of permeability and leaching characteristics. The volume of the resultant waste product is smaller than the volume of the resultant product of the solidification processes of the prior art.

The solids formed by the present process may be safely transported, and stored at various sites, such as landfills. One particular place for storing such waste solids is salt caverns that are located throughout the United States. Such storage may be accomplished by direct placement of the solids into the disposal site or by pumping the treated waste prior to solidification down into a salt cavern where it is allowed to solidify by permanent storage.

FIG. 1 illustrates a flow diagram of the present invention as operated in a semibatch mode. In this semibatch mode of operation, the contacting of pH-adjusted heavy metal-containing waste with sulfide is carried out batchwise. The separation of liquid and solids and the adjustment of liquid content in the waste are accomplished continuously through the settling or sedimentation and water cycloning or centrifugation.

With reference to FIG. 1, the heavy metal-containing waste is passed along feed line 10 into tank 12. The neutralizing reagent, either calcium oxide or calcium hydroxide, may also be passed through feed line 10. Feed hopper 14 communicates by line 16 with tank 12 so as to pass the sulfide (either sodium hydrosulfide, sodium sulfide, or their mixture) into tank 12. Tank 12 serves to store, neutralize, and react the heavy metal-containing waste. Pump 18 is connected by line 20 with tank 12. Pump 18 blends, recycles, and transports the heavy metal-containing waste in tank 12. Pump 18 can then pass the waste through recycle line 22 back into tank 12 for further reaction, neutralization, or storage. Transport line 24 is connected to pump 18 to pass the reacted waste into settling tank 26. Settling tank 26 allows the reacted heavy metal-containing waste to separate into sludge containing the heavy metal sulfide precipitate and a resulting supernatant. Line 28, which is connected to settling tank 26, is a transport line for the supernatant from the settling tank 26 to a hydrocyclone (or centrifuge) 30. The precipitate from the settling tank 26 is passed through withdraw line 32 connected to the bottom of settling tank 26. The material passed through withdraw line is the concentrated waste. The hydrocyclone (or centrifuge) 30 is utilized for the purpose of separating fines. Line 34 passes the fines from hydrocyclone 30 into withdraw line 32. Transport line 36 is connected to hydrocyclone 30. Transport line 36 passes the supernatant resulting from the hydrocyclone process to the process unit for further treatment or for reuse. A diversion line 38 is connected to transport line 36 so as to selectively cause the supernatant in transport line 36 to be passed to the withdraw line 32. Pump 40 adjusts the water content of the concentrated waste within withdraw line 32. Pump 40 transports the pretreated heavy metal-containing waste to the solidification unit. Pump 40 passes such material to the solidification unit through line 42. Once the pretreated heavy metal-containing waste has passed through line 42, it is received and processed in the manner described hereinbefore.

Figure 2:
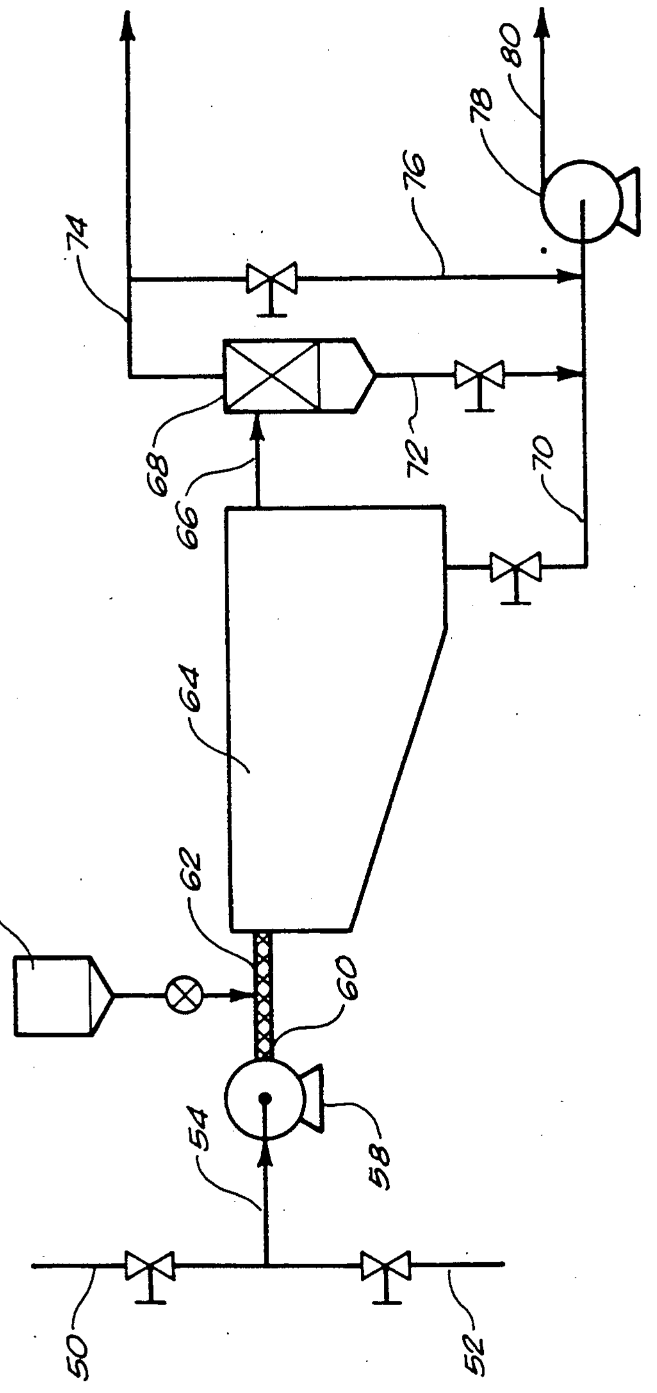
FIG. 2 is a flow diagram of the process of the present invention for a continuous mode of operation.

FIG. 2 illustrates the continuous mode for the processing of the heavy metal-containing waste. In the example of FIG. 2, the liquid or slurry waste, the pH-adjusting reagent, and the sulfide compound are continuously fed into the settling tank which serves simultaneously as the pH-adjusting and heavy metal sulfide-forming tank. The remainder of the process is operated continuously as in FIG. 1.

Specifically, FIG. 2 illustrates the heavy metal-containing waste feed line 50. The neutralizing reagent (calcium oxide or calcium hydroxide) is passed through feed line 52. Feed lines 50 and 52 connect into line 54. As a result, the waste is appropriately neutralized in process. Feed hopper 56 contains the sodium hydrosulfide, the sodium sulfide, or their mixture. The sodium hydrosulfide, the sodium sulfide, or their mixture, is for the purpose of transforming the heavy metals into sulfides and reducing the solubility of the heavy metals within the waste. Pump 58 blends and transports the waste with the neutralizing reagent. This neutralized waste passes into line 60 for encountering the sulfide. Line 62 is an in-line static mixer-transport line for the waste to the settling-reacting tank 64. The settling-reacting tank receives the material from line 62 and allows the heavy metals to appropriately transform into sulfides and settle to the bottom of tank 64. Transport line 66 passes the supernatant from the settling-reacting tank 64 to the centrifuge (or hydrocyclone) 68. Withdraw line 70 is connected to the settling-reacting tank 64 so as to remove the concentrated waste. Centrifuge 68 is operated so as to separate the fines. The separated fines pass into withdraw line 72 so as to be transported to the withdraw line 70. Line 74 is utilized to pass the supernatant from the centrifuge 68 to the process unit for further treatment or reuse. Diversion line 76 allows the selective transport of the supernatant to the concentrated waste withdraw line 70. Pump 78 can then be utilized to pass the concentrated waste, to adjust the water content of such waste, and to transport the waste through line 80 to the solidification unit. The solidification process is carried out utilizing the chemical reagent and the pozzolanic material as described herein previously.

The following examples further illustrate the invention, but are not to be construed as limitations on the scope of the process contemplated herein.

EXAMPLE I

An electroplating sludge, produced by a major manufacturing company located on the west coast of the U.S., was determined to contain approximately 7 wt % of solids. The leachabilities of the heavy metals in the sludge are given in Table I hereinafter. This waste was treated in accordance with the following steps of the present invention. First, 170 grams (or 150 ml) of the electroplating sludge were separated into a liquid part (110 grams) and a slurry part (60 grams) by a centrifuge. Secondly, the pH of the liquid part (110 grams) was adjusted to 9.0 by adding 0.15 gram of calcium hydroxide ($Ca(OH_2)$). Thirdly, 0.9 gram of 50 wt % sodium hydrosulfide (NaHS) solution were added to the pH-adjusted liquid. The supernatant was decanted and the precipitates were recovered after treatment. Fourthly, 2.5 grams of 50 wt % sodium hydrosulfide (NaHS) solution were added to the slurry that was concentrated in the first step. This was then mixed with the recovered sulfide compounds obtained in the third step. The slurry obtained in the fourth step was solidified by adding 3.0 grams of the chemical reagent, 18.0 grams of Portland cement, and 42.0 grams of Class F fly ash.

The leachabilities of cadmium, chromium, copper, lead, nickel and zinc in the original sludge, separated supernatants before and after treatment, and the solidified waste are summarized in Table I. These leachabilities were determined according to the Toxicity Characteristics Leaching Procedure (TCLP) as specified by the U.S. EPA. The comparison of the leachabilities of heavy metals with the respective EPA limits, also listed in Table indicates that the solidified waste clearly meets the delisting criteria of the EPA.

TABLE I

Leachabilities of cadmium, chromium, copper, lead, nickel, and zinc in the original sludge, separated supernatants before and after treatment, and solidified waste in mg/L.

| Metals | Original sludge | Supernatant before treatment | Supernatant after treatment | Solidified waste | EPA limits |
|---|---|---|---|---|---|
| Cadmium | 0.2 | 0.313 | ND(0.005) | ND(0.005) | 1.0 |
| Chromium | 154.0 | 1.74 | 0.13 | ND(0.03) | 5.0 |
| Copper | 5.0 | 3.09 | ND(0.03) | ND(0.03) | 100.0 |
| Lead | 0.8 | ND(0.10) | ND(0.10) | ND(0.10) | 5.0 |
| Nickel | 12.0 | 4.68 | 0.84 | ND(0.04) | 50.0 |
| Zinc | 0.3 | 0.22 | ND(0.02) | ND(0.02) | 500.0 |

C
ND(), where noted, indicates none detected with the detection limit in parentheses.

EXAMPLE II

The method of the present invention was used to treat steel baghouse dust as collected at a midwestern steel plant. The steps of this treatment process were as follows: First, 45 grams of water were added to 105 grams of the waste. Secondly, 2.0 grams of 50 wt % sodium hydrosulfide (NaHS) solution were added to the waste. Thirdly, 4.0 grams of the chemical reagent were added to the waste. Fourthly, 45.0 grams of Portland cement were added, as the pozzolanic agent, to the waste.

The leachabilities of cadmium, chromium, and lead in the original baghouse dust and the solidified waste, determined by the TCLP, are summarized in Table II hereinbelow. As can be seen, the treated waste meets the EPA criteria for delisting.

TABLE II

Leachabilities of cadmium, chromium, and lead in the original baghouse dust and solidified waste in mg/L.

| Metals | Original baghouse dust | Solidified waste | EPA limits |
|---|---|---|---|
| Cadmium | 1.97 | ND(0.005) | 1.0 |
| Chromium | 4.54 | ND(0.03) | 5.0 |
| Lead | 23.30 | 4.19 | 5.0 |

ND(), where noted, indicates none detected with the detection limit in parentheses.

EXAMPLE III

One hundred (100) grams of acid liquid waste containing 7.50 percent by weight of solids were blended with ten (10) grams of chemical reagent containing 0.125 grams of glycerine, 0.125 gram of polyethylene glycol, and 9.7 grams of 39 percent calcium chloride solution in water, i.e. about 3.8 grams of calcium chloride and 5.9 grams of water. Following, one hundred (100) grams of lime dust were blended in the aforementioned mixture. The resultant mixture was poured into molds. The set time was approximately five hours and the final set time was ten (10) hours.

EXAMPLE IV

One hundred (100) grams of baghouse steel dust were blended with 15 grams of Portland cement. In a separate container, seven (7) parts of water (12.85 grams) were added to one (1) part of chemical reagent (2.65 grams) containing 0.03 gram of glycerine, 0.03 gram of polyethylene glycol, and 2.59 grams of 39 percent calcium chloride solution in water to form 15.5 grams of diluted chemical reagent. The chemical reagent was then added to a separately-formed blend of baghouse steel dust and Portland cement. The resultant mixture was allowed to solidify.

EXAMPLE V

The procedure of Example II was repeated utilizing fifty (50) grams of Class C fly ash instead of 15 grams of Portland cement.

EXAMPLE VI

One hundred (100) grams of dry soil were mixed with fifty (50) grams of Class C fly ash. In a separate container, five parts (5) of water (13.5 grams) were added to one (1) part of chemical reagent (4.0 grams) containing 0.05 gram of glycerine, 0.05 gram of polyethylene glycol, and 3.9 grams of 39 percent calcium chloride solution in water to form 17.5 grams of diluted chemical reagent. Following, the diluted chemical reagent was added to the soil/fly ash blend and was allowed to solidify.

EXAMPLE VII 17.5 grams of diluted chemical reagent were formed by adding two (2) parts of water (9.5 grams) to one (1) part of chemical reagent (8.0 grams) containing 0.11 gram of glycerine, 0.11 gram of polyethylene glycol, and 7.78 grams of 39 percent calcium chloride solution in water. Following, the diluted chemical reagent was mixed with one hundred (100) grams of wet soil. The resultant mixture was mixed with fifty (50) grams of Class C fly ash. The resultant mixture was allowed to solidify.

EXAMPLE VIII

One hundred (100) grams of sludge waste from an oil separator containing forty (40) percent by weight of solids were blended with 2.5 grams of chemical reagent containing 0.05 grams of glycerine, 0.05 gram of polyethylene glycol, and 2.4 grams of 39 percent calcium chloride solution in water. Following, one hundred (100) grams of Class C fly ash was added to the mixture and blended therewith.

EXAMPLE IX

The procedure of Example VIII was repeated using five (5) grams of the same chemical reagent.

EXAMPLE X

One hundred (100) grams of sludge from an oil separator containing sixty (60) percent by weight of solids were blended with 2.5 grams of the same chemical reagent used in Example VIII. Following, sixty (60) grams of Class C fly ash were added and blended with the mixture.

EXAMPLE XI

The procedure of Example X was repeated using five (5) grams of the same chemical reagent.

EXAMPLE XII

One hundred (100) grams of chrome plating waste containing 7.5 percent by weight of solids were blended with 2.5 grams of the same chemical reagent used in Example XI. Following, 75 grams of Class C fly ash were blended with the mixture and the resultant blend was allowed to solidify.

EXAMPLE XIII

The procedure of Example XII was repeated utilizing the same waste with 15 percent by weight of solids.

EXAMPLE XIV

The procedure of Example XII was repeated utilizing five (5) grams of chemical reagent.

EXAMPLE XV

The procedure of Example XII was repeated utilizing five (5) grams of the same chemical reagent.

The foregoing disclosure and description of the invention are illustrative and explanatory thereof. Various changes in the process steps may be made within the scope of the appended claims without departing from the true spirit of the invention. The invention should only be limited by the following claims and their legal equivalents.

We claim:

1. A process for immobilizing a hazardous waste containing a heavy metal comprising the steps of:

adding a sulfide to said hazardous waste so as to generate a sulfide of said heavy metal;

mixing a chemical reagent with the hazardous waste containing the generated sulfide of said heavy metal, said chemical reagent containing a mixture of a retarder and an accelerator, said accelerator comprising calcium chloride, said retarder selected from the group consisting of: glycerine and polyethylene glycol; and blending the mixture of said chemical reagent and said hazardous waste containing the generated sulfide of said heavy metal with a pozzolanic material.

2. The process of claim 1, further comprising the step of:

mixing a neutralizing agent with said hazardous waste so as to cause said hazardous waste to have a pH between 5 and 14.

3. The process of claim 2, said neutralizing agent added so as to cause said hazardous waste to have a pH between 7 and 11.

4. The process of claim 2, said neutralizing agent being a chemical selected from the group consisting of: lime, hydrate lime and calcium hydroxide.

5. The process of claim 1, said sulfide being a chemical selected from the group consisting of: sodium hydrosulfide and sodium sulfide.

6. The process of claim 5, said sulfide being a 5 weight percent to the saturated solution of sodium hydrosulfide.

7. The process of claim 1, further comprising the step of:

separating the hazardous waste containing the generated sulfide of said heavy metal from the supernatant portion of said hazardous waste prior to the step of mixing said chemical reagent.

8. The process of claim 7, said step of separating:

decanting said supernatant from the hazardous waste containing the generated sulfide of said heavy metal.

9. A process for immobilizing a hazardous waste containing a heavy metal comprising the steps of:

neutralizing said hazardous waste such that said hazardous waste has a pH of between 5 and 14;

adding a sulfide to the neutralized hazardous waste so as to generate a sulfide of said heavy metal from said hazardous waste;

separating the waste containing the generated sulfide of said heavy metal from the supernatant of said hazardous waste; and solidifying said waste containing the generated sulfide of said heavy metal said step of solidifying comprising:

mixing a chemical reagent with the hazardous waste containing the generated sulfide of said heavy metal, said chemical reagent containing the mixture of a retarder and an accelerator, said retarder being a chemical selected from the group consisting of: glycerine and polyethylene glycol, said accelerator comprising calcium chloride.

10. The process of claim 9, said step of neutralizing comprising:

adding a neutralizing agent to said hazardous waste in such a quantity as to cause said hazardous waste to have a pH of between 7 and 11.

11. The process of claim 10, said neutralizing agent being a chemical selected from the group consisting of:

lime, hydrated lime, and calcium hydroxide.

12. The process of claim 9, said sulfide being a chemical selected from the group consisting of:

sodium hydrosulfide and sodium sulfide.

13. The process of claim 12, said sulfide being a 5 weight percent to the saturated solution of sodium hydrosulfide.

14. The process of claim 9, said step of separating comprising:

decanting said supernatant from the hazardous waste containing the generated sulfide of said heavy metal.

15. The process of claim 9, said step of separating comprising:

removing said supernatant from said hazardous waste containing the generated sulfide of said heavy metal by centrifuging.

16. The process of claim 9, said step of separating comprising:

removing said supernatant from said hazardous waste containing the generated sulfide of heavy metal by filtering.

* * * * *